US011240814B2

(12) United States Patent
Martinez et al.

(10) Patent No.: US 11,240,814 B2
(45) Date of Patent: Feb. 1, 2022

(54) WIRELESS VEHICULAR COMMUNICATIONS WITH CHANNEL ALLOCATION INVOLVING DIFFERENT PROTOCOLS

(71) Applicant: NXP B.V., Eindhoven (NL)

(72) Inventors: Vincent Pierre Martinez, Roques (FR); Michael Andrew Fischer, San Antonio, TX (US); Alessio Filippi, Eindhoven (NL)

(73) Assignee: NXP B.V., Eindhoven (NL)

( * ) Notice: Subject to any disclaimer, the term of this patent is extended or adjusted under 35 U.S.C. 154(b) by 4 days.

(21) Appl. No.: 16/711,707

(22) Filed: Dec. 12, 2019

(65) Prior Publication Data
US 2020/0296709 A1 Sep. 17, 2020

(30) Foreign Application Priority Data
Mar. 13, 2019 (EP) .................................... 19305299

(51) Int. Cl.
*H04W 72/04* (2009.01)
*H04L 29/06* (2006.01)
(Continued)

(52) U.S. Cl.
CPC ........... *H04W 72/048* (2013.01); *H04L 69/18* (2013.01); *H04W 72/082* (2013.01); *H04W 84/005* (2013.01)

(58) Field of Classification Search
CPC ......... H04L 29/06; H04L 69/14; H04L 69/18; H04L 69/24; H04L 5/14; H04L 5/0016;
(Continued)

(56) References Cited

U.S. PATENT DOCUMENTS 9,271,241 B2 2/2016 Kenney et al.
9,344,238 B2 5/2016 Vermani et al.
(Continued)

OTHER PUBLICATIONS

Non-final office action dated Dec. 16, 2020 in U.S. Appl. No. 16/669,694.
(Continued)

*Primary Examiner* — Mewale A Ambaye

(57) ABSTRACT

Aspects of the present disclosure are directed to methods and/or apparatuses involving stations (102, 104, 105) participating in wireless station-to-station communications in which each of a plurality of stations shares a wireless communications channel (101). Information is collected wirelessly (102) from transmissions associated with a first communication protocol and from transmissions associated with a second communication protocol. A current communication environment is dynamically discerned therefrom (102), and used to characterize a dynamic relationship of the collected information, which is indicative of respective usage of the wireless communication channel by data transmitted via the respective protocols. Usage of the channel is allocated (102) for respective communications that use the first and second communication protocols based on the dynamic relationship. Sets of data (110, 111, 120, 121, 122) are wirelessly transmitted via the first and second communication protocols over the channel, based on the allocated usage.

20 Claims, 4 Drawing Sheets

(51) Int. Cl.
*H04W 72/08* (2009.01)
*H04W 84/00* (2009.01)

(58) Field of Classification Search
CPC .... H04L 5/0017; H04L 5/0053; H04W 72/04; H04W 4/46; H04W 72/02; H04W 72/0453
See application file for complete search history.

(56) References Cited

U.S. PATENT DOCUMENTS

| | | |
|---|---|---|
| 10,820,348 B2 | 10/2020 | Khoryaev et al. |
| 2009/0116427 A1* | 5/2009 | Marks ................ H04L 5/0007 370/328 |
| 2009/0323614 A1 | 12/2009 | Wang et al. |
| 2010/0309834 A1 | 12/2010 | Fischer et al. |
| 2016/0234313 A1 | 8/2016 | Kellner et al. |
| 2017/0251339 A1* | 8/2017 | Addepalli ............... G06F 21/45 |
| 2018/0176058 A1 | 6/2018 | Kim et al. |
| 2018/0191470 A1* | 7/2018 | Manolakos ........... H04W 72/12 |
| 2018/0219701 A1* | 8/2018 | Seo ..................... H04J 11/0079 |
| 2020/0162587 A1 | 5/2020 | Martinez et al. |
| 2020/0228247 A1* | 7/2020 | Guo ..................... H04L 1/1854 |
| 2020/0228949 A1* | 7/2020 | Bharadwaj ........... H04L 5/0094 |
| 2020/0229171 A1* | 7/2020 | Khoryaev ............. H04W 72/08 |
| 2021/0014656 A1* | 1/2021 | Mueck ............. H04W 74/0816 |

OTHER PUBLICATIONS

Final office action dated Jun. 4, 2021 in U.S. Appl. No. 16/669,694.
Notice of Allowance dated Jun. 16, 2021 in U.S. Appl. No. 16/669,694.

\* cited by examiner

WIRELESS VEHICULAR COMMUNICATIONS WITH CHANNEL ALLOCATION INVOLVING DIFFERENT PROTOCOLS

CROSS-REFERENCE TO RELATED APPLICATIONS

This application claims the priority under 35 U.S.C. § 119 of European Patent application no. 19305299.0, filed on 13 Mar. 2019, the contents of which are incorporated by reference herein.

OVERVIEW

Aspects of various embodiments are directed to apparatuses and methods for providing wireless vehicular communications based on a dynamic relationship between the use of two (or more) protocols.

Wireless communications such as those involving vehicle-to-everything (V2X) communications are used to pass information from a vehicle to another entity, and vice versa. As vehicles e.g., stations) employing V2X can be moving, V2X communications can form an ad-hoc network when two or more V2X devices (stations) come within each other's range. V2X communications can be provided using different types of technology which utilize communications protocols for providing wireless vehicular communications. Such communications may, for example, be carried out using a control channel of a V2X band, such as a 10-MHz portion of spectrum channel) in the 5.9 GHz intelligent transport services (ITS) band.

While V2X communications have been useful, it can be challenging to implement different types of such communications, such as those involving different protocols. For instance, communications standards may evolve or change in different environments. Further, as the lifetime of a vehicle may be 20 years or more, such systems may exist for a long time, requiring backwards compatibility.

These and other matters have presented challenges to efficiencies of wireless vehicular communications implementations, for a variety of applications.

SUMMARY

Various example embodiments are directed to issues such as those addressed above and/or others which may become apparent from the following disclosure, as may relate to vehicular communications circuitry and related wireless communications involving different protocols.

Certain embodiments are directed to a communications approach for an environment involving respective stations that communicate with each other via different protocols over a common channel. At least one of the stations is configured for communicating with both protocols, and does so by assessing usage of the common channel by the respective protocols and transmitting different messages via the respective protocols based on the assessed usage. In some implementations in which the station operates using a new/improved protocol relative to other stations using a legacy protocol, messages are sent via the legacy protocol to ensure backwards compatibility with legacy stations, and further messages are sent via the new/improved protocol for communicating data therein together with a preamble or other data that is discernable by the legacy stations. With this approach, desirable attributes of a new/improved protocol can be utilized when appropriate, while ensuring backwards compatibility. Further, by assessing the communication environment (e.g., a geographical area in which the station operates during a particular time envelope), the allocation of channel use can dynamically change based on changes in the environment. This approach also facilitates the introduction of new protocols while ensuring backwards compatibility with legacy stations using the old protocol during their phase out time (as the number of such stations using such old protocols decreases).

In certain embodiments, one or more apparatuses as characterized herein include vehicular communications circuitry in different vehicles and/or stations. One or both vehicular communications circuitry communicate in accordance with approaches characterized herein, with two or more protocols being used in transmitting a communication to two or more receivers using different messages respectively based on different types of protocols.

As may be implemented in accordance with one or more embodiments, a method involving wireless station-to-station communications in which each of a plurality of stations shares a wireless communications channel is carried out as follows. In communications circuitry in a station participating in the wireless station-to-station communications, information is wirelessly collected respectively from transmissions associated with a first communication protocol and from transmissions associated with a second communication protocol. A current communication environment of the station is dynamically discerned, in which the communication environment characterizes a dynamic relationship of the collected information from the respective transmissions. The collected information is indicative of respective usage of the wireless communication channel by data transmitted via the respective protocols. Usage of the channel is allocated for communications that use the first communication protocol and for communications that use the second communication protocol, based on the dynamic relationship. Sets of data are wirelessly transmitted via the first communication protocol and via the second communication protocol over the channel, based on the allocated usage.

In accordance with one or more aspects of the disclosure, an apparatus includes communications circuitry in a station participating in wireless station-to-station communications in which each of a plurality of stations shares a wireless communications channel, and transmission circuitry. The communications circuitry is configured and arranged to collect information wirelessly respectively from transmissions associated with a first communication protocol and from transmissions associated with a second communication protocol, and dynamically discerns a current communication environment of the station that characterizes a dynamic relationship of the collected information from the respective transmissions. The collected information is indicative of respective usage of the wireless communication channel by data transmitted via the respective protocols. The communications circuitry further allocates usage of the channel for communications that use the first communication protocol and for communications that use the second communication protocol, based on the dynamic relationship. The transmission circuitry is configured and arranged to wirelessly transmit sets of data via the first communication protocol and sets of data via the second communication protocol over the channel, based on the allocated usage.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
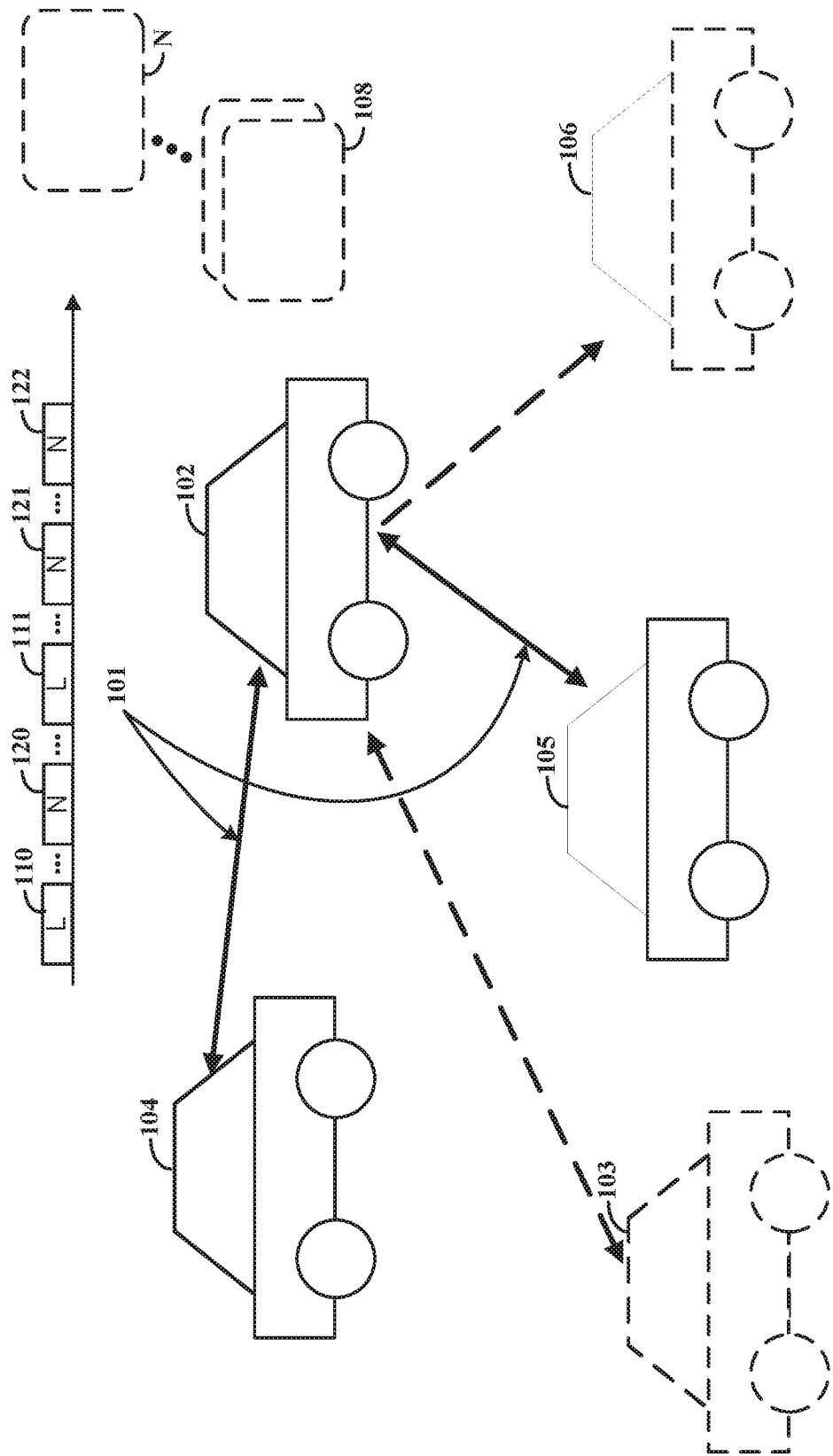
FIG. 1 illustrates an example wireless communications system and approach, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless vehicular communications, such as may be carried out using different protocols. In certain implementations (e.g., embodiments), aspects of the present disclosure have been shown to be beneficial when used in the context of transmitting separate wireless communications using different protocols over a common channel, based on a dynamic relationship between such protocols as present in an environment in which the transmissions are made. While not necessarily so limited, various aspects may be appreciated through the following discussion of non-limiting examples which use exemplary contexts.

In various embodiments, a communication approach as characterized above may utilize a single channel for communicating respective packets, each carrying data in accordance with different protocols relative to one another, utilizing an adaptive transmit rate and physical layer parametrization. For instance, packets intended for processing by stations utilizing a first type of protocol, such as a legacy protocol, can be generated and sent using the first protocol, while packets intended for processing by stations using a second (e.g., newer) protocol can be generated and sent in accordance with that protocol. The balance between the on-time communication of respective packets is dynamically adjusted, using the adaptive transmit rate and physical layer parametrization, based on one or more of: the number of stations sensed in a given environment that respectively utilize each protocol, the amount of data number of packets) communicated using each protocol, and the amount of time utilized for communications for each protocol. In this regard, stations using the new/other protocol can communicate with stations that use the respective protocols by generating both types of packets. This facilitates, for example, beneficial use of a new/other protocol while ensuring backwards compatibility with a legacy protocol. In some such instances, packets generated using the new/other protocol include some information that is configured according to the legacy protocol such that those aspects may be discernable by stations using the legacy protocol (e.g., while being unable to decode aspects of the packet configured with the new/other protocol). In these and other contexts, a station refers to a communication node in a network, such as a base station, or any communication node, operating using one or more of many protocols.

In more specific embodiments, a communication environment is discerned in a manner that characterizes a dynamic relationship pertaining to data communications of respective protocols, such as discussed above. This dynamic relationship may change, for example, as different types of devices that communicate using different ones of the protocols enter or leave a particular communication environment. The dynamic relationship is then used to allocate channel usage relative to the respective protocols indicated via the collected information. This allocation can thus change over time to suit a changing environment (e.g., the environment of a vehicle as it travels). For instance, where a series of packets may be communicated in a given transmission period, the number of packets allocated to the respective communication protocols can be dynamically changed, based on discerned environmental conditions. These conditions may involve detecting one or more of the number of other devices in the environment that communicate with each protocol (or with an old protocol only, relative to communicating with both an old and new protocol), the number of messages pertaining to each protocol, or the time used to communicate via respective protocols. In this context, transmissions in accordance with a new/other communication protocol may include information allocated to a legacy protocol, such as preamble data.

Vehicles, such as automobiles, trains or boats, and other stations/devices such as may be implemented with a drone, a bicycle, a pedestrian and/or a traffic controller, may be in dynamic communication environments (e.g., in which some communications circuits are moving relative to one another) and include communications circuitry for wirelessly communicating with other stations using a communication protocol, sometimes herein referred to as vehicle-to-everything (V2X) communications. In such contexts, some exemplary implementations can utilize wireless communications in accordance with IEEE 802.11p, or as otherwise specified in the IEEE 802.11-2016 specification, which is fully incorporated herein by reference (e.g., for implementation of communication protocols and approaches with FIGS. 1-2, or packet configuration as shown in FIG. 3).

Figure 4:
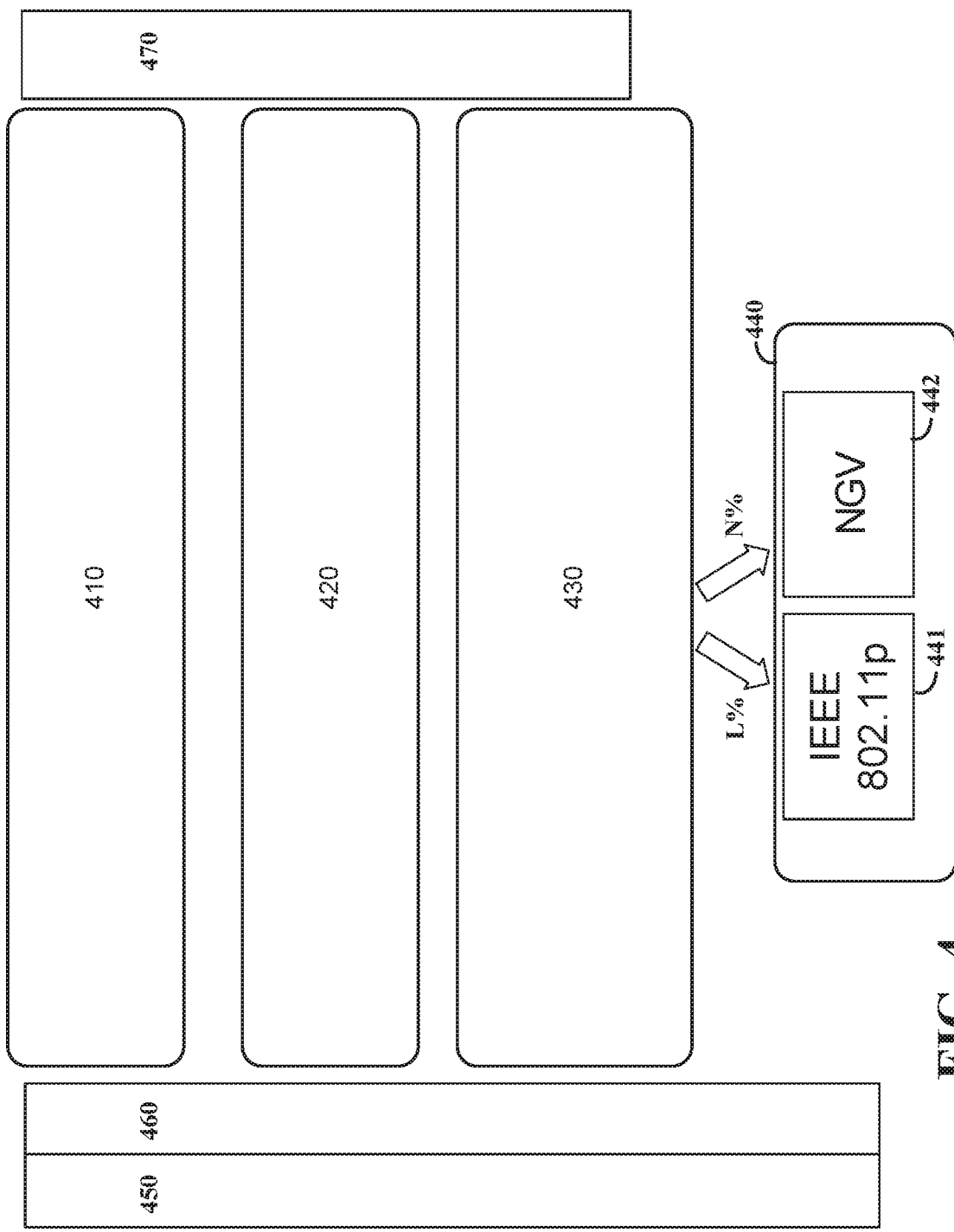
FIG. 4 illustrates a communications stack structure, as can be implemented with a communication station in accordance with the present disclosure.

In certain example embodiments, communications approaches herein utilize protocols as specified in Section 21.3.2 (VHT PPDU format) of the IEEE, 802.11-2016 specification, as may include aspects depicted in FIG. 21-4 and Tables 21-4 and 21-30. Such VHT (very high throughput) PPM (physical layer (PHY) protocol data unit) can thus be implemented using various types of modulation as shown in Table 21-30, with communication fields as shown in Table 21-4 and as communicated via symbols shown in FIG. 21-4.

As an example, a vast number of automobile-type vehicles that are currently in the field, and/or are about to be, communicate with one another via wireless communications (transmitter/receiver) circuits installed in respective vehicles using one or more protocols that accommodate the transitory operation of the vehicles. As a more specific example, such communications can be implemented using one or more of a protocol including a control channel, limited range communications (e.g., less than a few kilometers), open-access networks (e.g., involving ad-hoc communications that operate without an otherwise available communications infrastructure such as a cellular network), short-time communications intervals (e.g., less than 1 second, less than 500 ms or less than 100 ms), and/or communications capable of handling high speeds between stations of up to 500 km/h relative to one to another. Such vehicles may use a control channel of the V2X band that can include a 10 megahertz (MHz) portion of the spectrum in the 5.9 gigahertz (GHz) ITS band. Embodiments in accordance with the present disclosure can include use of a newer standard that is interoperable with an older standard, and that provides improvement to system-level performance. Certain such embodiments involve appending data symbols of the newer standard after data symbols of the older standard, within a common communication. The number/time of symbols communicated in this regard can be tailored to suit the environment.

As a specific example, a new generation vehicle (NGV) standard such as IEEE 802.11bd, a 3GPP 4G LTE-V2X and/or 3GPP 5G NR standard can be used to improve system level performance, relative to a protocol standard such as IEEE 802.11p, for communication in an ITS, when used in accordance with one or more embodiments herein. The NGV features may improve overall system effectiveness, including the "legacy IEEE 802.11p" devices. As may be appreciated, legacy devices may include or refer to devices in the field that provide V2X using an older standard, such as IEEE 802.11p. The newer standard is backwards compatible with the older standard, in order to avoid having two groups of devices (e.g., the legacy IEEE 802.11p devices and NGV devices) that are incompatible with each-other while in the field. For example, the newer standard or set of specifications can define a communications protocol that is a superset of protocols, hence making it possible to use the same or otherwise compatible communications with devices operating according to the older standard or set of specifications.

Accordingly, allocating communications involving legacy communications as characterized herein may be implemented by setting a number, or other characteristic of data (e.g., packets) communicated with a payload having a new/other protocol relative to data communicated using the legacy protocol. In some implementations, the data communicated using the new/other protocol includes some information, such as preamble information, that can be discerned by stations that use the legacy protocol and cannot otherwise utilize the new/other protocol. Accordingly, the newer standard may improve performance of devices operating on both the newer and older standards by improving a range and/or reliability of messages communications and/or spectral efficiency (e.g., by sending similarly robust signals that are shorter in time, allowing for more transmitters). Performance may be facilitated by dynamically modifying the allocation of data packets and/or some physical layer parameters, such as modulation and coding scheme (sometimes referred to as transmit rate). Such parameters may be used for communicating under respective protocols based on the number of such communications and/or such devices making such communications with each respective protocol.

As may be implemented in accordance with one or more embodiments, wireless vehicle-to-vehicle (such as V2X) communications are carried out in an environment in which each of a plurality of stations (e.g., vehicles) shares a wireless communications channel. Such a channel and related communications may be carried out utilizing an ad-hoc wireless communications network in which transmissions are broadcast for asynchronous receptions by circuitry in one or more devices. Communications circuitry in a vehicle or other station that participates in the vehicle-to-vehicle communications operates to wirelessly collect information from transmissions associated with a legacy communication protocol and from transmissions associated with another communication protocol. Such transmissions may, for example, emanate from different transmitters operating on different vehicles and/or devices.

A current communication environment of the vehicle is dynamically discerned such that the communication environment characterizes a dynamic relationship of the collected information using the legacy communication protocol relative to the collected information using the other communication protocol. This may, for example, characterize a number of transmitters in the environment (e.g., within a range of the vehicle) that respectively operate using a legacy protocol relative to another protocol. This may also (or in the alternative) characterize a number of transmissions using the respective protocols or the amount of time utilized for transmissions using the respective protocols.

Communications are wirelessly transmitted from the communications circuitry over the wireless communications channel using the legacy communication protocol and the other communication protocol, by allocating usage of the channel through transmissions of respective sets of data (via the other communication protocol, as may in some instances include aspects of the legacy communication protocol) based on the dynamic relationship. For instance, usage of the channel can be allocated according to a ratio of the number of transmitters using the respective protocols, which may vary as dynamically discerned while the environment undergoes changes (e.g., as the vehicle and other vehicles/devices move). In some implementations, disparate packets respectively having data using the legacy communication protocol only, and having data using the other communication protocol, may be transmitted in this regard with the number of each respective packet set based on the dynamically discerned communication environment.

Accordingly, dynamically discerning the current communication environment may include dynamically characterizing numbers of transmitters or messages in the environment that respectively utilize the legacy communication protocol and that utilize the other communication protocol as the as the environment changes. Usage of the channel may be allocated by dynamically allocating data symbols to the legacy communication protocol and to the other communication protocol in accordance with the dynamically characterized number of transmitters or messages using the respective protocols. Such an approach may involve utilizing a ratio of a number of transmitters or messages in the environment that communicate via the respective protocols, by allocating an amount of data packets to the legacy communication protocol and to the other communication protocol based on such a ratio e.g., and the time and/or bandwidth taken up by packets of the respective protocols). The ratio may thus pertain to a number of transmitters that respectively communicate with the legacy or other communication protocols, based a number of messages that respectively utilize the legacy or other communication protocol, or based on channel use by the respective protocols.

In various implementations, a backwards-compatible station such as an NGV station send two or more types of packets, with one of the types of packets being compatible with a (e.g., legacy) protocol, and another compatible with a different (e.g., newer) protocol, with the number or amount of bandwidth allocated to each respective type of packets being based upon usage characteristics of the protocols in the relevant environment. For instance, the modulation and coding scheme (MCS) (sometimes also referred to as transmit rate) and message generation rate of each technology.

In some implementations, a number of transmitter stations using a new communication protocol (NumStations$_{NGV}$) and a number of stations using a legacy communications protocol (NumStations$_{legacy}$) are used to derive a ratio, for instance by stations utilizing ITS communications. Specifically, NGV users measure NumStations$_{NGV}$ and NumStations$_{legacy}$ and derive a Tech$_{percentage}$ ratio as follows:

$$Tech_{percentage} = \frac{NumStations_{NGV}}{NumStations_{legacy} + NumStations_{NGV}}$$

In this context, NumStations$_{legacy}$ is the number of packets (or stations) received or observed over a time duration, such as over one second of a time block code (TBC) originating from legacy IEEE 802.11p stations. NumStations$_{NGV}$ is the number of packets received (or stations observed) over a time duration, such as over one second of a TBC originating from NGV stations. In some implementations, messages from NGV encoded in accordance with the legacy standard are counted in a NumStations$_{NGV}$ category, and not part of NumStations$_{legacy}$ stations. The Tech$_{percentage}$ metric can be mapped to a "state" that defines certain message encoding rules.

In certain embodiments, three or more protocols are utilized in a particular communication environment, in which successively-implemented protocols are backwards compatible in a manner such as characterized herein, to communicate data discernable by one, two or more legacy (incumbent) protocols. For instance, such an embodiment may involve 11p (IEEE 802.11p) stations, NGV stations, and 5G V2X stations, in which the NGV stations are backwards compatible with the 11p stations, and in which the 5G V2X stations are backwards compatible with the 11p and NGV stations. A channel utilization can be discerned for all three (or more) protocols, possibly originating from different families of technologies such as IEEE or 3GPP.

As may be implemented in accordance with one or more embodiments, wireless station-to-station communications are carried out, in which each of a plurality of stations shares a wireless communications channel, in communications circuitry in a station participating in the wireless station-to-station communications, information is wirelessly collected from transmissions associated with first and second communication protocols, and a current communication environment of the station is dynamically discerned to characterize a dynamic relationship of the collected information from the respective transmissions. Such a dynamic relationship may, for example, be indicative of respective usage of the wireless communication channel by data transmitted via the respective protocols. Various embodiments involve the use of three or more such protocols, which are discerned accordingly. Usage of the channel is allocated for communications that use the first communication protocol and for communications that use the second communication protocol, based on the dynamic relationship.

Sets of data, such as data packets, are wirelessly transmitted via the first communication protocol and via the second communication protocol over the channel, based on the allocated usage. For instance, data packets are generated having a preamble and data payload configured in accordance with the first communication protocol, and separate data packets are generated having a data payload configured with the second communication protocol, based on the dynamic relationship. Within a particular packet, preamble data can be transmitted according to the first communication protocol and payload data can be transmitted according to the second communication protocol.

Dynamically discerning a current communication environment may be carried out in a variety of manners. For instance, as the environment changes for a particular station, various stations may move in or out of the environment and/or the station itself may move. Accordingly, characteristics that may change include: channel usage by the first communication protocol relative to the other communication protocol, numbers of transmitters in the environment that respectively utilize the first communication protocol and that utilize the other communication protocol, numbers of messages in the environment that respectively utilize the first communication protocol and that utilize the other communication protocol, and a combination thereof. These characteristics can be utilized to assess the communications environment as it changes, and allocate packet usage of a communication channel therein.

In a particular embodiment, usage of the channel is allocated by allocating respective amounts of communications or channel usage to each of the first communication protocol and the second communication protocol. The sets of data are wirelessly transmitted via the second communication protocol by transmitting both preamble data and payload data, in which the payload data is transmitted via the second communication protocol and the preamble data is transmitted via one or both of the first communication protocol and the second communication protocol. In some implementations, the payload data includes a first signal portion indicative of characteristics of a second data portion of the payload data that follows the first signal portion (e.g., the first signal portion may double as what may otherwise be considered a preamble or header). In other implementations, the sets of data transmitted via the first communication protocol include preamble data and payload data respectively transmitted via the first communication protocol (e.g., an entire packet may be communicated using a legacy protocol). In further implementations, payload data of respectively-communicated packets is implemented in accordance with the aforesaid examples.

In another more particular embodiment, respective amounts of communications or channel usage are allocated to each of the first communication protocol and the second communication protocol, and the sets of data are wirelessly transmitted via the second communication protocol by transmitting both preamble data and payload data in which the payload data is transmitted via the second communication protocol and the preamble data is transmitted via the first communication protocol. The payload data has a first signal portion indicative of characteristics of a second data portion of the payload data that follows the first signal portion. In some implementations, a particular one of the plurality of stations is configured to communicate via the first and second communication protocols, and decodes the sets of data wirelessly transmitted via the first communication protocol by using the first communication protocol to decode the preamble to ascertain information about the payload data, and by using the ascertained information to decode the payload data. The particular station decodes the sets of data wirelessly transmitted via the second communication protocol by using the first communication protocol to decode the preamble to ascertain information about the payload data, decodes the first signal portion of the payload data to ascertain information about the second data portion of the payload data, and decodes the second data portion of the payload data using the ascertained information.

In another embodiment, respective amounts of communications or channel usage are allocated to each of the first communication protocol and the second communication protocol, and the sets of data transmitted via the second communication protocol include preamble data and payload data. The preamble data is transmitted via the first communication protocol and the payload data is transmitted via the second communication protocol.

Channel usage may be allocated using one or more of a variety of approaches. In some embodiments, a ratio of channel usage to messages coded via first communication protocol and to messages coded via the second communication protocol is determined based on one or more of: a ratio of the number of transmitters that communicate with the first communication protocol to the number of transmitters that communicate using the other communication protocol, a ratio of the number of messages that utilize the first communication protocol to the number of messages that utilize the other communication protocol, a ratio of the channel usage by messages utilizing the first communication protocol relative to the messages utilizing the other communication protocol, and a combination thereof.

The integration time (time over which the messages or stations or air-time are counted) can be set in a variety of ways. For instance, a fixed duration may be used, such as by setting a value such as 100 ms, or 1 second. A variable duration may be used and determined based on conditions, such as speed of a vehicle in which a station is traveling. Such an approach could be useful for addressing the needs of a rapidly changing environment, in a vehicle such as a high-speed train, relative to a station in a slowly-changing environment, such as may be traveling with a bicycle or on a human walking. Other variables, such as a quantity of stations, location, and more can be used to tailor such a duration of time during which messages, stations or air-time are assessed.

Similarly, discerning a current communication environment may be carried out using a variety of factors. Such an approach may utilize environmental conditions pertaining to one or more of a number of transmitters using the first communication protocol; a number of messages using the first communication protocol; a number of transmitters using the second communication protocol; a number of messages using the second communication protocol; time used to transmit messages of the first communication protocol; time used to transmit messages of the second communication protocol; noise; speed of the station having the communications circuitry; geographic location of the environment; type of station from which the transmissions emanate; and a combination thereof.

In accordance with an apparatus-based embodiment, an apparatus includes communications circuitry for a station participating in wireless station-to-station communications in which each of a plurality of stations shares a wireless communications channel, as well as transmission circuitry. The communications circuitry allocates usage of the channel by respective protocols, and the transmission circuitry transmits sets of data via the respective protocols based on the allocated usage. Where first and second protocols are utilized, the communication circuitry wirelessly collects information from transmissions associated with each of the protocols, and dynamically discerns a communication environment of the station that characterizes a dynamic relationship of the collected information from the respective transmissions. The collected information is indicative of respective usage of the wireless communication channel by data transmitted via the respective protocols. The communications circuitry then allocates usage of the channel for communications that use the first communication protocol and for communications that use the second communication protocol, based on the dynamic relationship, and where such allocation is used by the transmission circuitry as noted above.

The communications and transmission circuitry may be implemented in a variety of manners. In some embodiments, the communications circuitry allocates respective amounts of communications or channel usage to each of the first and second communication protocols; and the transmission circuitry wirelessly transmits the sets of data via the second communication protocol by transmitting preamble data and payload data. The payload data may be transmitted via the second communication protocol and the preamble data is transmitted via one or both of the first communication protocol and the second communication protocol. For instance, where backwards compatibility with the first communication protocol is desired, the preamble data is communicated with the first communication protocol. Where backwards compatibility is not required (e.g., if no stations that communicate with the first communications protocol are present in the environment), the preamble data is communicated in accordance with the second communication protocol. Further, the payload data may include, at an initial portion thereof, preamble type data for use with the second communication protocol in decoding the rest of the payload data (e.g., where an actual preamble transmitted therewith is coded via the first communication protocol). Both payload and preamble data may also be communicated via the first communication protocol, based on allocated usage (e.g., when most or all stations in an environment are legacy stations communicating with the first protocol and unable to communicate via the second protocol).

In a more particular embodiment, the communications circuitry allocates respective amounts of communications or channel usage to each of the first communication protocol and the second communication protocol, and the transmission circuitry operates therewith to wirelessly transmit sets of data having preamble data communicated via the first protocol and payload data communicated via the second communication protocol. The payload data has a first signal portion indicative of characteristics of a second data portion of the payload data that follows the first signal portion.

In another particular embodiment, the communications circuitry dynamically discerns the current communication environment by characterizing, as the environment changes, information selected from the group of: channel usage by the first communication protocol relative to the other communication protocol, numbers of transmitters in the environment that respectively utilize the first communication protocol and that utilize the other communication protocol, numbers of messages in the environment that respectively utilize the first communication protocol and that utilize the other communication protocol, and a combination thereof. Respective data packets are dynamically allocated to the first communication protocol and to the second communication protocol in accordance with the characterized information, for transmission.

Turning now to the figures, FIG. 1 illustrates an example wireless communications system and approach involving dynamically-used channels (101), in accordance with the present disclosure. A plurality of vehicles 102-107 as well as miscellaneous vehicles/devices 108-N are shown, some or all of which may participate in communications, and one or more of Which include communication circuitry that communicates using one or more protocols in accordance with one or more embodiments as characterized herein. In the context of various embodiments, the vehicles and/or miscellaneous vehicles/devices may include automobiles, trains, boats, bicycle and/or pedestrian devices (e.g., mobile telephones or wearables), or non-mobile devices such as may be implemented with road side units or traffic controllers e.g., stoplights, gates, bridges, and train crossings). Each such vehicle/device can include a station that effects communications as characterized herein.

In a particular embodiment, vehicle 102 communicates with vehicles operating using different protocols, including vehicle 104 operating with a (first) legacy communication protocol and vehicle 105 operating with a (second) NGV communication protocol. Vehicle 102 may also operate in more populated environments involving one of more of vehicles 103 and/or 106 and miscellaneous vehicles/devices 108-N. Communication circuitry in vehicle 102 collects information wirelessly respectively from transmissions associated with the legacy communication protocol (at least from vehicle 104) and from transmissions associated with another communication protocol (at least from vehicle 105) over a particular wireless communications channel. Other transmissions according to the legacy communication protocol may be received from vehicle 103 or one or more of miscellaneous vehicle/devices 108-N. Further transmissions according to the other (e.g., NGV or 3GPP 5G NR) communication protocol may be received from vehicle 106 or one or more of miscellaneous vehicles/devices 108-N, some or all of which may also communicate via the legacy communication protocol.

The communication circuitry in vehicle 102 dynamically discerns a current communication environment of the vehicle that characterizes a dynamic relationship of the collected information using the legacy communication protocol relative to the collected information using the other communication protocol. Such an approach may, for example, involve determining numbers of vehicles in the environment respectively using the legacy or other communication protocols, determining a number of communications associated with each respective protocols, or both. An environment in this context may pertain to a communication range of several meters to a few kilometers.

The communications circuitry in vehicle 102 wirelessly transmits data over the wireless communications channel using the legacy communication protocol and using the other communication protocol, by allocating usage of the channel through transmissions of respective sets of data (e.g., packets) via the respective communication protocols based on the dynamic relationship. For instance, transmissions may be allocated such that a certain percentage of communications or bandwidth are dedicated to the communication of data/payload allocated to the legacy communication protocol and the remaining percentage is dedicated to the communication of data/payload allocated to another (e.g., NGV or 3GPP 5G NR) communication protocol. For instance, FIG. 1 shows an example use of the channels 101 in which 40% of data packets (110, 111) over a certain period of time are allocated to a legacy "L" protocol, and 60% of data packets (120, 121, 122) are allocated to an NGV "N" protocol. Allocation in this manner may mean, for example, that the legacy packets 110 and 111 carry data according to the legacy protocol, and the NGV packets 120, 121 and 122 carry data according to the NGV protocol (but may, for example, include preamble data recognizable by legacy protocol stations).

The wireless communications depicted in FIG. 1 may involve V2X communications, which may include multiple types of communications such as: vehicle-to-vehicle (V2V), vehicle-to-infrastructure (V2I), vehicle-to-network, (V2N) and vehicle-to-pedestrian (V2P). In specific instances, a V2X network may enable an exchange of information between a plurality of vehicles and, in some instances, other devices. As may be appreciated, as used herein "circuitry" refers to one or more circuits, such as a plurality of similarly-operating (or version of) circuits operating in respective vehicles, one or more of which may involve programmable devices utilizing software. The vehicles can communicate messages to one another, such as speed measurements, communication measurements, GPS data, etc., via the vehicular communications circuits. In various embodiments, this additional data is also used in allocating communications to respective protocols, such as to prioritize vehicles that are closer geographically or operating at higher rates of speed. Vehicles may use V2V for a variety of use cases, such as emergency electronic brake light, emergency vehicle approaching notification, train approaching notification or collision avoidance but not limited thereto, where both parties of the communication have circuitry equipped on different vehicles. Accordingly, where FIG. 1 or (other embodiments herein refer to vehicles or vehicular communications, such communications as shown in FIG. 1 or otherwise can include a plurality of different types of devices such as those characterized herein, each having vehicular-type communications circuitry used to provide V2X communications. In this context, the term "vehicular" in vehicular communications circuitry and/or vehicular communications apparatuses is not intended to be limiting to vehicle devices, but rather indicates or refers to circuitry and/or apparatuses used to provide vehicular-type communications, such as V2X communications.

As may be consistent with the above, different vehicles and other types of devices may utilize different technologies for performing V2X communications that operate using communications protocols. Many vehicles presently use IEEE 802.11p, with a number of vehicles in the field, or about to be in the field, using such technology. Such devices may herein be referred to as legacy devices, which can include or refer to legacy IEEE 802.11p devices, or other older protocols in use. Newer standards may be implemented that have improved and/or different features over the older standard, such as features that improve a robustness of the physical layer stack, which in turn can cause or otherwise lead to an extended range of communication between circuits. It can be useful to have the newer standard compatible with the older standard so that newer standard devices and older standard devices can communicate. As noted herein, the older standard devices may be in the field for twenty or more years and it can be difficult to provide updates to all vehicles (or other types of devices) in the field.

The communication protocol technologies characterized herein, including legacy and other/NGV technologies, may be IEEE 802.11-based technology, such as IEEE 802.11p or other Wi-Fi technology. Referring to FIG. 1, each of the newer standard and older standard devices/vehicles may thus be implemented with communications circuitry that wirelessly communicates using a communications protocol that is consistent with Wi-Fi or IEEE 802.11p-based communications. The communications protocols used may involve sending messages asynchronously. For example, communications circuitry can observe (e.g., listen) the channel and communicate in response to the channel being clear (e.g., no messages being transmitted).

Figure 2:
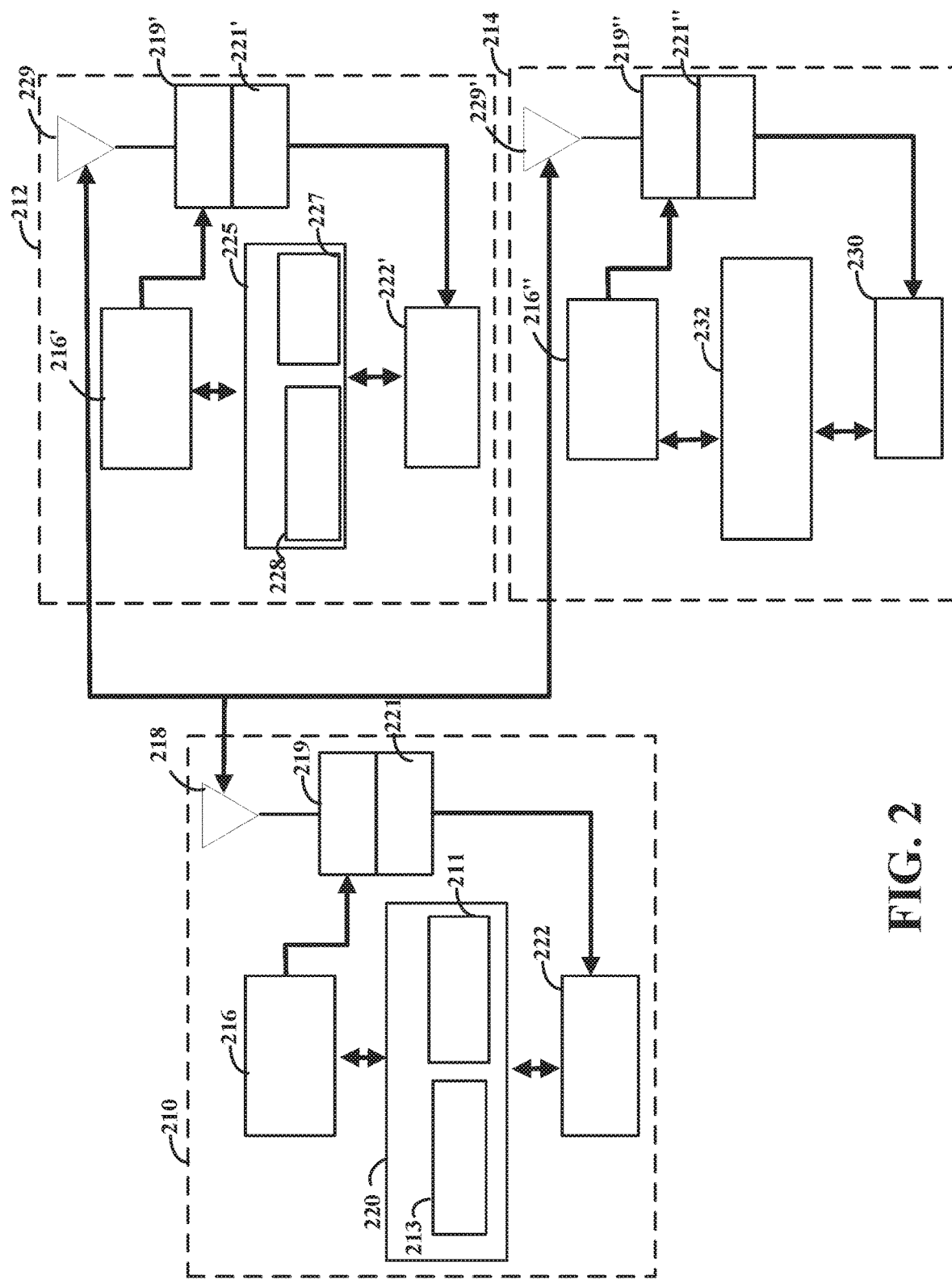
FIG. 2 illustrates example communications circuitry of a plurality of stations, in accordance with the present disclosure.
Figure 3:
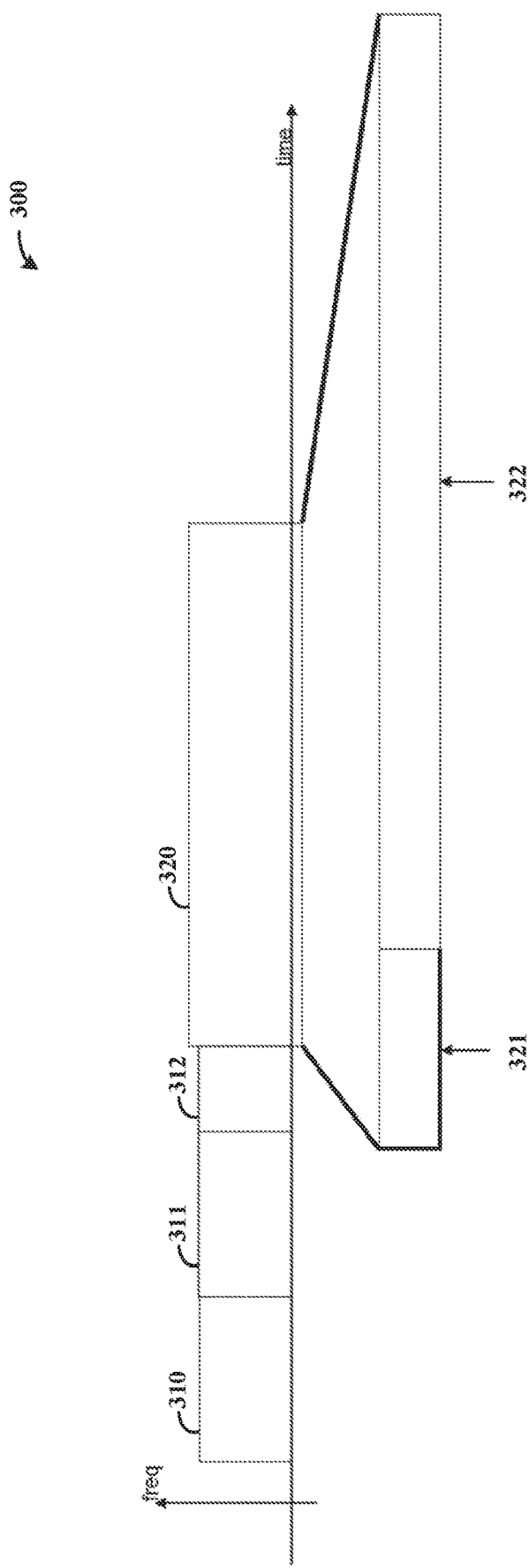
FIG. 3 shows an approach to configuring a data packet dedicated a particular protocol, in accordance with the present disclosure.

FIG. 2 illustrates example communications circuitry of a plurality of stations, in accordance with various embodiments. Each of the communications circuitries 210, 212, 214 (stations) can communicate wirelessly in a wireless communications network using a communications protocol by transmitting data over a channel, which is received by other circuitry in a shared device geography/communication environment. More specifically, FIG. 2 illustrates first communications circuitry 210 and second communications circuitry 212 that operate according to a first (e.g., newer/other) communication type (e.g., standard) and third communications circuitry 214 that operates according to a second (e.g., older/legacy) communication type. Multiple additional communication circuits can be implemented, such as may involve a multitude of automobiles and/or other stations in an environment.

The communications circuitries 210, 212, 214 include certain common circuitry types as may be implemented similarly. The first communications circuitry 210 includes a transmit (TX) processor 216 and receive (RX) processor 222 used with a controller/processor 220 to implement various functionality for transmitting and receiving messages in accordance with both legacy and newer/other communication protocols. The first communications circuitry 210 also includes transmitter 219, receiver 221, and antenna 218. The controller/processor 220 includes a collector 213 that collects information about messages and/or a number of transmitters and/or channel usage in the environment that respectively involve first communication types, which may involve time used to transmit messages of the first type.

The controller/processor 220 also includes an environmental estimator 211 that uses the collected information to characterize the environment relative to the use of the respective protocol types, which can then be used by transmission circuitry in transmitting communications having data therein allocated in accordance with respective protocols. For instance, such an approach may involve allocating a number of symbols or time to respective sets of data pertaining to each respective protocol as communicated in disparate communications respectively dedicated to communicating data (e.g., payload) according to one of the protocols.

In various contexts, the controller/processor 220 is configured to facilitate respective communications of respective packets dedicated to the first and second types noted above, as follows. Packets in which data/payload is allocated to the first protocol may utilize preamble type data discernable by stations using the second protocol (yet which may, for example, be unable to discern the data/payload of the first protocol). Packets in which data/payload is communicated according to the second protocol may involve preamble type data that is also communicated according to the second protocol, where stations operating under the first protocol are backwards-compatible and able to discern such preamble type data of the second protocol. This may be consistent with the approach shown in FIG. 3 and described herein.

The second communications circuitry 212 is shown with similar functionality to that first communications circuitry 210, for processing and transmitting signals of both types/protocols, while third communications circuitry 214 is shown with controller/processor 232 operable to transmit and receive signals in accordance with the second protocol. The second communications circuitry 212 also includes a controller/processor 225, environmental estimator 227, collector 228, and antenna 229. As such, first communications circuitry 210 and second communications circuitry 212 are backwards compatible for receiving communications from (and sending certain communications to) third communications circuitry 214. As more or fewer types of vehicles or other stations employing legacy communications are present in an environment, the first communications circuitry 210 and second communications circuitry 212 alter their allocation. If no vehicles/stations using the second communication type are present, the first communications circuitry 210 and second communications circuitry 212 may operate using all communication allocation for the first communications type (e.g., new protocol), thus allowing for phase-out of the second communications type (e.g., of a legacy protocol). Allocation of channel usage in this manner may, for example, be carried out in accordance with the tables discussed further herein.

For ease of reference, certain ones each of the first communications circuitry 210 components, which include at least one communications circuit, are described, although as may be appreciated, each of the communications circuitries 210, 212, 214 may include similar components, with certain differences in controller/processors as shown in which controller/processors of the legacy type are depicted at controller/processor 232. For instance, second communications circuitry 212 includes related circuitry 216', 219', 221', and 222', and the third communications circuitry 214 includes related circuitry 216", 219", and 221".

In various implementations, the TX processor 216 can map to signal constellations based on various modulation schemes (e.g., binary phase-shift keying, quadrature phase-shift keying, and M-phase-shift-keying). The coded and modulated symbols are mapped to an orthogonal frequency-division multiplexing (OFDM) subcarrier and used to produce a physical channel carrying a time domain OFDM symbol stream. The stream is provided to the antenna 218 via a transmitter (TX) 219. The receiver (RX) 221 receives a signal through the antenna 218. It is noted that, although FIG. 2 illustrates single antennas for each communications circuit, embodiments are not so limited and can include separate RX and TX antennas and/or different antennas for different streams. The RX 221 recovers data modulated onto the RF carrier and provides the data to the RX processor 222, which may perform spatial processing on the data to recover spatial streams e.g., an OFDM data symbol stream). The RX processor 222 converts the OFDM data symbol stream from the time-domain to the frequency domain using a Fast Fourier Transform (FFT) and uses the same to recover data and control signals which are provided to the controller/processor 220. The controller/processor 220 processes data received in the data messages.

Similarly to that described above, the third communications circuitry 214, which operates in accordance with the second communications type, includes a TX processor 216" and an RX processor 230 used to implement various functionality for transmitting and receiving messages in accordance with a communications protocol, e.g., an IEEE 802.11-based protocol as may involve Wi-Fi and/or IEEE 802.11p. Data messages are provided by the TX processor 216" to the antenna 229' for wirelessly communicating data via the TX 219". The RX 221" receives a signal through the antenna 229' and provides recovered data to the RX processor 230, similarly to that described above. The RX processor 230 converts the data stream (e.g., those packets in the data stream dedicated to the second communications type such as a legacy protocol) to recover the data and provides the same to the controller/processor 232. The controller/processor 232 processes data received in data messages. Communications (e.g., packets) including data/payload of the first protocol may be processed at the third communications circuitry 214 where preamble type data includes data of the second communications type, and where the data/payload communicated in accordance with the first communications type appears as high energy/undiscernible information.

Each of the first, second, and third communications circuitries 210, 212, 214 may communicate wirelessly using a communications protocol in which messages are sent asynchronously and over the same channel. The messages can each have a preamble that includes a legacy short training field (L-STF) that provides support of synchronization and automatic gain control (AGC) calibration (e.g., which can be 8 μsec), a legacy long training field (L-LTF) that provides channel estimation pilot for decoding subsequent Wi-Fi-based symbols (e.g., which can be 16 μsec), and a signal field (SIG) symbol that conveys the MCS (e.g., which can be 8 μsec). Messages dedicated to the legacy protocol may have all fields configured as such, whereas messages dedicated to a new/other protocol may utilize legacy communications in the preamble only.

As a specific example, the first communications circuitry 210 may broadcast disparate messages (e.g., once/second or ten times/second) for asynchronous receptions by other circuitry (including the second and third communications circuitry 212, 214) in which some of the messages have data/payload communicated in accordance with a legacy protocol and in which other ones of the messages have data/payload communicated in accordance with another/new protocol. Such a communications may be implemented such that the allocation of messages to the respective protocols is dynamically modified over time as the environment changes, in accordance with the detected communications from other circuitry in the environment. For instance, where 3GPP 4G LTE-V2X or 3GPP 5G NR communications are used, the new/other section of communications can be adapted, based on metrics such as those used for NGV. The second communications circuitry 212 receives and processes the messages communicated in accordance with the other/new protocol (and may also process the messages communicated in accordance with legacy communications). The third communications circuitry 214 processes the messages communicated in accordance with the legacy protocol, and for those other messages having only preamble data communicated in accordance with the legacy protocol, ignoring payload data communicated in accordance with the new/other protocol. Such an approach may, for example, be implemented in accordance with FIGS. 3 and 4 and the corresponding discussion herein.

As may be appreciated, communications (and as may be applicable, communication networks) are not limited to the number of stations and/or communications circuitries as illustrated by FIGS. 1 and 2. Various embodiments can include greater or fewer stations having communications circuitries in a shared device geography, and additional or fewer types of stations having communications circuitries (e.g., mobile phones). The number of stations can also change over time due to movement of vehicles or other stations and/or additional stations entering the shared station geography (e.g., forming ad-hoc network(s)).

FIG. 3 shows an approach to configuring a data packet 300 that is dedicated a particular (e.g., new, such as NGV) protocol yet having some preamble type data discernable by a different (e.g., legacy) protocol, in accordance with the present disclosure. Preamble data packet portions 310, 311 and 312 can be encoded with the different/legacy protocol (and may be represented as a single preamble) that is discernable by stations operating in accordance with the different/legacy protocol as well as stations that are backwards-compatible with the different/legacy protocol. Such preamble data packet portions may be encoded as an IEEE 802.11p packet, allowing legacy IEEE 802.11 stations to detect the packet, and decode information depicting packet duration (and therein allowing such stations to identify a length of time during which the channel will be busy).

Other data/payload portion 320 is coded with the particular (new) protocol. In particular, such a portion may include a first portion 321 that is discernable by stations using the particular/new protocol and that includes information useful for decoding a second/payload data portion 322, such as may pertain to an NGV protocol. The data portion 320 thus may include modulated symbols that are intrinsically more spectrally efficient relative to symbols included in portions 310-312 (e.g., legacy IEEE 802.11p symbols). The data portion 320 may include data coded in accordance with a variety of approaches, may include additional subcarriers and different channel estimation pilots symbols and/or location throughout the packet duration, relative to the symbols in 310-312. For instance, the data portion 320 may include one or more OFDM symbols that convey important information such the MCS & the packet duration, MIMO and LDPC settings, and the payload.

Referring to FIG. 4, a communications stack structure 400 is shown, which can be implemented with a communication station in accordance with the present disclosure. The amount of packets that are routed from an upper applications layer 410, through a facilities layer 420, a network and transport layer 430, and an access technology layer 440, to either first (e.g., legacy IEEE 802.11p) or NGV, respectively depicted as L % and N % which express an amount of messages that are routed (by layer 430) to a given access technology. The stack structure 400 may also include a common data directory 450, cross-link component 460 and security component 470. The number or allocated bandwidth of packets distributed according to respective access technologies can be based on randomness, or a round-robin scheme. For example, here is a mechanism based on randomness:

Draw a number "xlegacy" uniformly distributed between [0:1].
   i. if "xlegacy"≤L, do transmit the packet to IEEE 802.11p access layer
   ii. if "xlegacy">L, do NOT transmit the packet to IEEE 802.11p access layer Draw a number "xngv" uniformly distributed between [0:1].
   iii. if "xngv"≤N, do transmit the packet to NGV access layer
   iv. if "xngv">N, do NOT transmit the packet to NGV access layer For instance, the L and N percentages are adjusted, physical layer parameters may be left unadjusted. More complex schemes in which both the L & N percentages, as well as the physical layer parameters, can be adapted.

Referring to Table 1, respective communication states are shown and as may be set in accordance with a dynamic relationship of information collected using respective communication protocols, in accordance with one or more embodiments. Consistent with the above, the percentage of L and N packets may be set in accordance with the approaches shown in and discussed with FIG. 4 and otherwise herein. By way of example, Table 1 shows an exemplary situation where both L & N are set to 100% (e.g., with adaptation of MCS). If the total on-time of the transmitting station is not changed, the physical layer parameters of each protocol are set to provide an equivalent (or nearly equivalent) total time. For instance, the time-of-11p+time-of-NGV may be set as equal to a reference time of 11p-stations-encoded-with-QPSK½. Allocation of a communication can be made in accordance with six different states and in accordance with a legacy (IEEE 802.11p) and new modulation protocol, however more or fewer states or protocols may be used, as may dynamic adjustment, to suit particular embodiments.

bits of the legacy standard SIG to value of one, as opposed to them traditionally being set to zero in legacy IEEE 802.11p transmissions.

In states 2-5, an increasing amount of the communication is transmitted using symbols from the new/other communication protocol while the amount of the communication using symbols from the legacy communication protocol is decreased. The percentage allocation may vary to suit particular applications. In addition, a type of modulation utilized may be varied as well, with exemplary modulation types for state 2 including QPSK (¾), for state 3 including 16 quadrature amplitude modulation (QAM) (½), for state 4 including 16 QAM (¾), and for state 5 including 64 QAM (⅔). State 6 is shown as allocating the entire communication to the new/other protocol along with an STF. In certain situations, the STF (which can be coded with the legacy protocol and detected by all stations) permits for common indication of station-to-station communications activity.

TABLE 1

| | Tech$_{percentage}$ | Legacy 802.11p PPDU encoding (10 MHz channel) | 802.11p Packet on-time duration | New modulation Packet on-time duration | New modulation encoding, example |
| --- | --- | --- | --- | --- | --- |
| state 1 | ≤60% | QPSK ½ (6 Mb/s) | 100% | 0% | none |
| state 2 | [60%-70%[ | QPSK ¼ (9 Mb/s) | 67% | 33% | 16QAM ¾ |
| state 3 | [70%-80%[ | 16QAM ½ (12 Mb/s) | 50% | 50% | 16QAM ½ |
| state 4 | [80%-90%[ | 16QAM ¾ (18 Mb/s) | 33% | 67% | QPSK ¾ |
| state 5 | [90%-100%[ | 64QAM 2/3 (24 Mb/s) | 25% | 75% | QPSK 2/3 |
| state 6 | 100% | none | 0% | 100% | QPSK ½ |

Referring to state 1, the entire allocation is made to legacy communications, as may be implemented when most or all other transmitters or transmissions in an environment (relative to a Tech$_{percentage}$ as characterized herein) are made with the legacy protocol. As noted above, state 1 may be implemented where transmitters configured to operate using a new protocol are operating in accordance with the legacy protocol. Total packet duration in each state may be similar to a legacy IEEE 802.11p PDU encoded with (quadrature phase shift keying) QPSK ½ (rate 6 Mbps in a 10 MHz channel), as shown in state 1.

In various implementations, when a station using the new/other protocol transmits in a fully backwards compatible manner, other receiving stations that implement a new/other protocol (e.g., NGV) may identify such a station as new/other-protocol capable in a variety of manners. In some implementations, a new-LTF symbol may be transmitted within the section of the aggregated message pertaining to the new protocol. Receiving stations can therefore identify the new-LTF and derive the information that such message was in fact sent by a new-protocol-capable station. Other options are possible, such as setting some of the reserved As characterized herein, discerning a current communication environment may involve a variety of approaches, such as utilizing computations as disclosed herein above. In various implementations, a lookup table is utilized, such as by detecting detect a certain number of stations operating with respective protocols (e.g., NGV stations and legacy stations), and looking up a corresponding allocation in a memory circuit. In some implementations, such discerning involves utilizing information or a directive provided from another station (e.g., as may be mobile or fixed) or from a network such as a central provider (e.g., automotive-based) of navigation assistance communicating over cellular or satellite networks.

Table 2 shows a related approach in which L and N percentages are adjusted, such as may be implemented with FIG. 4. In such an approach, physical layer parameters may be left unadjusted, for example keeping the modulation and coding scheme as per legacy transmission settings.

TABLE 2

| | Tech$_{percentage}$ | Legacy 802.11p PPDU encoding (10 MHz channel) | Legacy 802.11p percentage of packets. L % | New modulation percentage of packets. N % |
| --- | --- | --- | --- | --- |
| state 1 | ≤60% | QPSK ½ (6 Mb/s) | 100% | 0% |
| state 2 | [60%-70%[ | QPSK ½ (6 Mb/s) | 67% | 33% |
| state 3 | [70%-80%[ | QPSK ½ (6 Mb/s) | 50% | 50% |
| state 4 | [80%-90%[ | QPSK ½ (6 Mb/s) | 33% | 67% |
| state 5 | [90%-100%[ | QPSK ½ (6 Mb/s) | 25% | 75% |
| state 6 | 100% | QPSK ½ (6 Mb/s) | 0% | 100% |

The long-term average (for example measured over a minute) of the total on-time duration of all the packets (IEEE 802.11p+NGV) may be identical (or nearly so) to the duration of the legacy IEEE 802.11p packet, when placed in the same environment (for example for ITS-G5, encoded as QPSK ½ 6 Mbps).

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in this disclosure (including claims) connote a plain meaning in the art unless otherwise indicated. As examples, aspects useful for implementing the claimed invention may be described and/or illustrated by way of various circuits or circuitry, using terms such as stations, blocks, modules, device, system, unit, controller, and/or other circuit-type depictions (e.g., reference numerals 108-N and 210, 211, 213, 216, 219, 220, and 221 depict blocks/modules as described herein). Such circuits or circuitry can be used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in the figures. In certain embodiments, such a programmable circuit is one or more computer circuits, which may include memory circuitry for storing and accessing a program to be executed as a set (or sets) of instructions (and/or to be used as configuration data to define how the programmable circuit is to perform), and an algorithm or process as described and/or claimed herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the disclosure may make reference to a legacy communication protocol and another communication protocol, or to related vehicular communications circuitry (e.g., first and second circuits) operating according to one or both protocols, terms such as first and second might be replaced with other terms such as legacy and other. Adjectives such as "first" and "second" are not used to connote any description of the structure or to provide any substantive meaning; rather, such adjectives are merely used for English-language antecedence to differentiate ones of such similarly-named structure from another similarly-named structure (e.g., "first circuit configured to broadcast . . . " is interpreted as "circuit configured to broadcast . . . ").

It is noted that the embodiments above have been described with reference to different subject-matter. In particular, some embodiments may have been described with reference to method-type features/aspects, whereas other embodiments may have been described with reference to an apparatus features/aspects. However, a person skilled in the art will gather from the above that, unless otherwise indicated, in addition to any combination of features/aspects belonging to one type of subject-matter, also any combination of features/aspects relating to different subject-matter, in particular a combination of features/aspects of the method-type subject-matter and features/aspects of the apparatus-type subject-matter, is considered to be disclosed with this document.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, stations or vehicular communications circuitry can include more or less circuit components than those illustrated by FIG. 1 or 2, and/or different ordered circuit components. In addition, embodiments characterized via protocols referred to as "Legacy" and "New" or "NGV" are exemplary and may thus simply utilize different protocols (e.g., as "first" and "second" protocols) without connotation to "Legacy" or "NGV" functions. As another example, additional communication protocols may be utilized within a communication, with packets allocated to each protocol in accordance with approaches such as characterized herein. Such modifications do not depart from the true spirit and scope of various aspects of the disclosure, including aspects set forth in the claims.

What is claimed is:

1. A method of a station comprising:

the station participating in wireless station-to-station communications in which each of a plurality of stations shares a wireless communications channel, collecting information wirelessly respectively from transmissions associated with a first communication protocol and from transmissions associated with a second communication protocol;

dynamically discerning a current communication environment of the station that characterizes a dynamic relationship of the collected information from the respective transmissions, the collected information being indicative of respective usage of the wireless communication channel by data transmitted via the respective protocols;

allocating usage of the channel for communications that use the first communication protocol and for communications that use the second communication protocol, based on the dynamic relationship; and wirelessly transmitting sets of data via the first communication protocol and sets of data via the second communication protocol over the channel, based on the allocated usage, the wirelessly transmitting sets of data includes generating and transmitting data packets having a preamble and data payload configured in accordance with the first communication protocol, and separate data packets having a data payload configured with the second communication protocol, based on the dynamic relationship.

2. The method of claim 1, wherein:

allocating usage of the channel includes allocating respective amounts of communications or channel usage to each of the first communication protocol and the second communication protocol; and wirelessly transmitting the sets of data via the second communication protocol includes:

transmitting preamble data and payload data, the payload data being transmitted via the second communication protocol and the preamble data being transmitted via one or both of the first communication protocol and the second communication protocol, or transmitting preamble data and payload data, the payload data being transmitted via the second communication protocol and the preamble data being transmitted via the first communication protocol, the payload data having a first signal portion indicative of characteristics of a second data portion of the payload data that follows the first signal portion, or transmitting preamble data and payload data, the preamble data being transmitted via the first communication protocol and the payload data being transmitted via the second communication protocol.

3. The method of claim 2, wherein the payload data in each of the sets of data transmitted via the second communication protocol includes a first signal portion indicative of characteristics of a second data portion of the payload data that follows the first signal portion.

4. The method of claim 1, wherein each of the sets of data transmitted via the first communication protocol include preamble data and payload data respectively transmitted via the first communication protocol.

5. The method of claim 2, further including, at one of the plurality of stations configured to communicate via the second communication protocol and to communicate via the first communication protocol,
   decoding the sets of data wirelessly transmitted via the first communication protocol by using the first communication protocol to decode the preamble to ascertain information about the payload data, and using the ascertained information to decode the payload data; and
   decoding the sets of data wirelessly transmitted via the second communication protocol by using the first communication protocol to decode the preamble to ascertain information about the payload data, decoding the first signal portion of the payload data to ascertain information about the second data portion of the payload data and decoding the second data portion of the payload data using the ascertained information.

6. The method of claim 1, wherein wirelessly transmitting the sets of data via the second communication protocol includes transmitting preamble data according to the first communication protocol and transmitting payload data according to the second communication protocol.

7. The method of claim 1, wherein dynamically discerning the current communication environment includes
   characterizing, as the environment changes, information selected from the group of: channel usage by the first communication protocol relative to the other communication protocol, numbers of transmitters in the environment that respectively utilize the first communication protocol and that utilize the other communication protocol, numbers of messages in the environment that respectively utilize the first communication protocol and that utilize the other communication protocol, and a combination thereof, or
   characterizing an environmental condition selected from the group consisting of: a number of transmitters using the first communication protocol; a number of messages using the first communication protocol; a number of transmitters using the second communication protocol; a number of messages using the second communication protocol; time used to transmit messages of the first communication protocol; time used to transmit messages of the second communication protocol; noise; speed of the station having the communications circuitry; geographic location of the environment; type of station from which the transmissions emanate; and a combination thereof.

8. The method of claim 7, wherein allocating the usage of the channel includes dynamically allocating respective data packets to the first communication protocol and to the second communication protocol in accordance with the characterized information.

9. The method of claim 1, wherein allocating the usage of the channel includes allocating a ratio of channel usage to messages coded via first communication protocol and to messages coded via the second communication protocol based a ratio selected from the group of: a ratio of the number of transmitters that communicate with the first communication protocol to the number of transmitters that communicate using the other communication protocol, a ratio of the number of messages that utilize the first communication protocol to the number of messages that utilize the other communication protocol, a ratio of the channel usage by messages utilizing the first communication protocol relative to the messages utilizing the other communication protocol, and a combination thereof.

10. An apparatus comprising:
   communications circuitry in a station participating in wireless station-to-station communications in which each of a plurality of stations shares a wireless communications channel, the communications circuitry being configured and arranged to:
      collect information wirelessly respectively from transmissions associated with a first communication protocol and from transmissions associated with a second communication protocol,
      dynamically discern a current communication environment of the station that characterizes a dynamic relationship of the collected information from the respective transmissions, the collected information being indicative of respective usage of the wireless communication channel by data transmitted via the respective protocols,
      dynamically discern the current communication environment by characterizing, as the environment changes, information selected from the group of: channel usage by the first communication protocol relative to the other communication protocol, numbers of transmitters in the environment that respectively utilize the first communication protocol and that utilize the other communication protocol, numbers of messages in the environment that respectively utilize the first communication protocol and that utilize the other communication protocol, and a combination thereof,
      allocate usage of the channel for communications that use the first communication protocol and for communications that use the second communication protocol, based on the dynamic relationship, and
      allocate the usage of the channel by dynamically allocating respective data packets to the first communication protocol and to the second communication protocol in accordance with the characterized information; and
   transmission circuitry configured and arranged to wirelessly transmit sets of data via the first communication protocol and sets of data via the second communication protocol over the channel, based on the allocated usage.

11. The apparatus of claim 10, wherein
   the communications circuitry is configured and arranged to allocate the usage of the channel by allocating respective amounts of communications or channel usage to each of the first communication protocol and the second communication protocol; and
   the transmission circuitry is configured and arranged to wirelessly transmit the sets of data via the second communication protocol by transmitting preamble data and payload data, the payload data being transmitted via the second communication protocol and the preamble data being transmitted via one or both of the first communication protocol and the second communication protocol.

12. The apparatus of claim 11, wherein the transmission circuitry is configured and arranged with the communications circuitry to
transmit the payload data in each of the sets of data transmitted via the second communication protocol with a first signal portion indicative of characteristics of a second data portion of the payload data that follows the first signal portion, or
transmit each of the sets of data via the first communication protocol with preamble data and payload data respectively via the first communication protocol.

13. The apparatus of claim 10, wherein
the communications circuitry is configured and arranged to allocate the usage of the channel by allocating respective amounts of communications or channel usage to each of the first communication protocol and the second communication protocol; and
the transmission circuitry is configured and arranged with the communications circuitry to wirelessly transmit the sets of data via the second communication protocol by:
transmitting preamble data and payload data, the payload data being transmitted via the second communication protocol and the preamble data being transmitted via the first communication protocol, the payload data having a first signal portion indicative of characteristics of a second data portion of the payload data that follows the first signal portion, or
transmitting preamble data and payload data, the preamble data being transmitted via the first communication protocol and the payload data being transmitted via the second communication protocol.

14. An apparatus comprising:
communications circuitry in a station participating in wireless station-to-station communications in which each of a plurality of stations shares a wireless communications channel, the communications circuitry being configured and arranged to:
collect information wirelessly respectively from transmissions associated with a first communication protocol and from transmissions associated with a second communication protocol,
dynamically discern a current communication environment of the station that characterizes a dynamic relationship of the collected information from the respective transmissions, the collected information being indicative of respective usage of the wireless communication channel by data transmitted via the respective protocols,
dynamically discern the current communication environment by characterizing, as the environment changes, information selected from the group of: channel usage by the first communication protocol relative to the other communication protocol, numbers of transmitters in the environment that respectively utilize the first communication protocol and that utilize the other communication protocol, numbers of messages in the environment that respectively utilize the first communication protocol and that utilize the other communication protocol, and a combination thereof,
allocate usage of the channel by allocating respective amounts of communications or channel usage to each of the first communication protocol and the second communication protocol, based on the dynamic relationship, and
allocate the usage of the channel by dynamically allocating respective data packets to the first communication protocol and to the second communication protocol in accordance with the characterized information; and
transmission circuitry configured and arranged to wirelessly transmit sets of data via the first communication protocol and sets of data via the second communication protocol over the channel, based on the allocated usage.

15. The apparatus of claim 14, wherein:
the transmission circuitry is configured and arranged to wirelessly transmit the sets of data via the second communication protocol by transmitting preamble data and payload data, the payload data being transmitted via the second communication protocol and the preamble data being transmitted via one or both of the first communication protocol and the second communication protocol.

16. The apparatus of claim 15, wherein:
the transmission circuitry is configured and arranged with the communications circuitry to transmit the payload data in each of the sets of data transmitted via the second communication protocol with a first signal portion indicative of characteristics of a second data portion of the payload data that follows the first signal portion.

17. The apparatus of claim 15, wherein:
the transmission circuitry is configured and arranged with the communications circuitry to transmit each of the sets of data via the first communication protocol with preamble data and payload data respectively via the first communication protocol.

18. A method of a station comprising:
the station participating in wireless station-to-station communications in which each of a plurality of stations shares a wireless communications channel, collecting information wirelessly respectively from transmissions associated with a first communication protocol and from transmissions associated with a second communication protocol;
dynamically discerning a current communication environment of the station that characterizes a dynamic relationship of the collected information from the respective transmissions, the collected information being indicative of respective usage of the wireless communication channel by data transmitted via the respective protocols, the dynamically discerning the current communication environment includes:
characterizing, as the environment changes, information selected from the group of: channel usage by the first communication protocol relative to the other communication protocol, numbers of transmitters in the environment that respectively utilize the first communication protocol and that utilize the other communication protocol, numbers of messages in the environment that respectively utilize the first communication protocol and that utilize the other communication protocol, and a combination thereof, or
characterizing an environmental condition selected from the group consisting of: a number of transmitters using the first communication protocol; a number of messages using the first communication protocol; a number of transmitters using the second communication protocol; a number of messages using the second communication protocol; time used to transmit messages of the first communication protocol; time used to transmit messages of the second communication protocol; noise; speed of the station having the communications circuitry; geographic location of the environment; type of station from which the transmissions emanate; and a combination thereof;

allocating usage of the channel for communications that use the first communication protocol and for communications that use the second communication protocol, based on the dynamic relationship; and wirelessly transmitting sets of data via the first communication protocol and sets of data via the second communication protocol over the channel, based on the allocated usage.

19. A method of a station comprising:

the station participating in wireless station-to-station communications in which each of a plurality of stations shares a wireless communications channel, collecting information wirelessly respectively from transmissions associated with a first communication protocol and from transmissions associated with a second communication protocol;

dynamically discerning a current communication environment of the station that characterizes a dynamic relationship of the collected information from the respective transmissions, the collected information being indicative of respective usage of the wireless communication channel by data transmitted via the respective protocols;

allocating usage of the channel for communications that use the first communication protocol and for communications that use the second communication protocol, based on the dynamic relationship, the allocating the usage of the channel includes allocating a ratio of channel usage to messages coded via first communication protocol and to messages coded via the second communication protocol based a ratio selected from the group of: a ratio of the number of transmitters that communicate with the first communication protocol to the number of transmitters that communicate using the other communication protocol, a ratio of the number of messages that utilize the first communication protocol to the number of messages that utilize the other communication protocol, a ratio of the channel usage by messages utilizing the first communication protocol relative to the messages utilizing the other communication protocol, and a combination thereof; and wirelessly transmitting sets of data via the first communication protocol and sets of data via the second communication protocol over the channel, based on the allocated usage.

20. An apparatus comprising:

communications circuitry in a station participating in wireless station-to-station communications in which each of a plurality of stations shares a wireless communications channel, the communications circuitry being configured and arranged to:

collect information wirelessly respectively from transmissions associated with a first communication protocol and from transmissions associated with a second communication protocol, allocate the usage of the channel by allocating respective amounts of communications or channel usage to each of the first communication protocol and the second communication protocol, dynamically discern a current communication environment of the station that characterizes a dynamic relationship of the collected information from the respective transmissions, the collected information being indicative of respective usage of the wireless communication channel by data transmitted via the respective protocols, and allocate usage of the channel for communications that use the first communication protocol and for communications that use the second communication protocol, based on the dynamic relationship; and transmission circuitry configured and arranged to wirelessly transmit sets of data via the first communication protocol and sets of data via the second communication protocol over the channel, based on the allocated usage, the transmission circuitry configured and arranged with the communications circuitry to wirelessly transmit the sets of data via the second communication protocol by:

transmitting preamble data and payload data, the payload data being transmitted via the second communication protocol and the preamble data being transmitted via the first communication protocol, the payload data having a first signal portion indicative of characteristics of a second data portion of the payload data that follows the first signal portion, or transmitting preamble data and payload data, the preamble data being transmitted via the first communication protocol and the payload data being transmitted via the second communication protocol.

* * * * *